US008647555B2

(12) United States Patent
Jin

(10) Patent No.: US 8,647,555 B2
(45) Date of Patent: Feb. 11, 2014

(54) PROCESSING METHOD FOR IN-MOLD COATING INTEGRATIVE SYSTEM

(76) Inventor: Yu-Syuan Jin, Tucheng (TW)

( * ) Notice: Subject to any disclaimer, the term of this patent is extended or adjusted under 35 U.S.C. 154(b) by 346 days.

(21) Appl. No.: 13/203,233

(22) PCT Filed: Mar. 26, 2010

(86) PCT No.: PCT/CN2010/071353
§ 371 (c)(1),
(2), (4) Date: Aug. 24, 2011

(87) PCT Pub. No.: WO2010/108455
PCT Pub. Date: Sep. 30, 2010

(65) Prior Publication Data
US 2012/0043702 A1    Feb. 23, 2012

(30) Foreign Application Priority Data
Mar. 27, 2009    (CN) .......................... 2009 1 0056997

(51) Int. Cl.
*B29C 45/06*    (2006.01)
*B29C 45/16*    (2006.01)
(52) U.S. Cl.
USPC ...... 264/328.8; 264/250; 264/255; 264/328.7
(58) Field of Classification Search
None
See application file for complete search history.

(56) References Cited

U.S. PATENT DOCUMENTS

| 5,254,164 | A  | * | 10/1993 | Masahumi | 118/58 |
| 6,019,921 | A  | * | 2/2000  | Lutz     | 264/129 |
| 6,558,599 | B1 | * | 5/2003  | Bethune  | 264/255 |
| 6,875,301 | B2 | * | 4/2005  | Kauppi et al. | 156/245 |
| 7,285,239 | B2 | * | 10/2007 | Bethune  | 264/494 |
| 7,524,538 | B2 | * | 4/2009  | Gram     | 427/508 |
| 7,875,224 | B2 | * | 1/2011  | Gruber   | 264/250 |
| 8,287,789 | B2 | * | 10/2012 | Zollner et al. | 264/255 |
| 8,388,330 | B2 | * | 3/2013  | Jin      | 425/112 |
| 2003/0038407 | A1 | * | 2/2003 | Bethune | 264/478 |
| 2005/0003100 | A1 | * | 1/2005 | Gram     | 427/553 |
| 2006/0138699 | A1 | * | 6/2006 | Zollner et al. | 264/255 |

FOREIGN PATENT DOCUMENTS

| CN | 101279312 A | * | 10/2008 |
| JP | 2000202852 A | * | 7/2000 |
| WO | WO 2006122497 A1 | * | 11/2006 |

* cited by examiner

*Primary Examiner* — Benjamin Schiffman
(74) *Attorney, Agent, or Firm* — Banger Shia

(57) ABSTRACT

A processing method for in-mold coating integrative system is used in cooperation with an injection molding machine. The injection molding machine comprises a rotatable work platform and a combination of at least one male mold and at least two female molds. The rotatable work platform is divided averagely into several work areas, and the processing proceeds sequentially in each work area by the rotation of the rotatable work platform. The processing method comprises following steps: injection molding a solid workpiece firstly, and leaving the solid work-piece on the male mold; rotating the rotatable work platform; performing surface coloring; rotating the rotatable work platform; injecting UV top-coat, the top-coat female mold is made of light-directing material and has a die cavity and a UV paint cavity on the surface of the solid workpiece, and a UV top-coat layer is injected into the UV paint cavity through a paint channel; irradiating the UV top-coat layer by a UV top-coat hardening lamp; and demolding to achieve a finished product. The method is of benefit to mass production, and can reduce labor cost and processing cost.

10 Claims, 6 Drawing Sheets

PROCESSING METHOD FOR IN-MOLD COATING INTEGRATIVE SYSTEM

BACKGROUND OF THE INVENTION

1. Field of the Invention

The present invention relates to an integrative processing method for integrating the procedures of coating, printing and etc applied to the surface of the injection molded product during injection molding, this method allows all the procedures to be consecutively carried out on the same injection molding machine, so that all the surface processing to the surface of the product can be done when the injection molding is finished.

2. Description of the Prior Art

The housings of many industrial, electronic, consumption or non-consumption products are all made by injection molding technique which is of benefit to mass production and versatile design. To make the housing have different colors for the aesthetic purpose and to have function identifier, such as a company's logo, patterns, or other description, after injection molding of the housing, a primer coat forming, transfer printing, laser engraving or other surface pattern forming process must be carried out, and finally a spraying process is applied to form a transparent top coat on the surface which has been subjected to the process of primer coat forming, transfer printing or laser engraving. There are many techniques to form the primer coat and the top coat, some are common methods, such as liquid spray paint, electrostatic powder coat, etc. Method of drying the coat includes natural air drying, hot air drying and UV (ultraviolet) drying, etc. The aforementioned various surface processing methods all comprises the steps of: injection molding of the housing, taking out the housing by demolding, and then putting the housing a work platform to process the housing with primer coating, transfer printing or laser engraving. The whole processing time is long since it involves loading, unloading, waiting, and preparation processing, which is not suitable for mass production and requires a lot of manpower and many inconsecutive processing procedures, thus substantially increasing the cost.

The existing method for primer coating, transfer printing or laser engraving the surface of the injection molded work piece always involves the time of loading, unloading, waiting, and preparation processing. The whole operation is not smooth and time-consuming, so it is unsuitable for mass production and needs a lot of manpower to carry out many processing procedures. Not only the processing time is long, but also the processing cost is high, and this is the problem to be solved.

The present invention has arisen to mitigate and/or obviate the afore-described disadvantages.

SUMMARY OF THE INVENTION

The primary object of the present invention is to provide a processing method for in-mold coating integrative system, after the workpiece is formed on the rotatable work platform by the injection molding machine, the formed solid workpiece can be directly processed in the work areas to sequentially form the UV primer-coat layer, the other-color layer and the top-coat layer without having to be demolded to wait for other inconsecutive processing procedures.

To achieve the abovementioned object, a processing method for in-mold coating integrative system of the present invention is used in cooperation with an injection molding machine which comprises a rotatable work platform and a combination of at least one male mold and at least two female molds, the rotatable work platform being divided into several work areas, and the processing proceeding sequentially in each work area by the rotation of the rotatable work platform, the processing method comprises the following steps:

injection molding of final product: in the first work area are provided a male mold and a molding female mold to be closed up to the male mold, between the male and female molds is arranged a cavity allowing for injection of colloid material through a colloid channel after the male and female molds are closed up to form a solid workpiece, and then the molding female mold retracts after injection molding;

rotating the rotatable work platform: the rotatable work platform rotates to move the male mold along with the solid workpiece from the first work area to the second work area;

injecting UV primer coat: on the male mold in the second work area is provided a primer-coat female mold to be closed up to the male mold, the primer-coat female mold is made of light-directing material and includes a die cavity, a UV paint cavity in the surface of the solid workpiece, and a paint channel in communication with the UV paint cavity, after the male mold and the primer-coat female mold are closed up, paint is injected through the paint channel into the UV paint cavity to form a UV primer-coat layer;

irradiating the UV primer coat by using UV primer-coat lamps: at least one UV primer-coat lamp is used to dry the UV primer-coat layer by irradiating light through the light directing primer-coat female mold, and the primer-coat female mold retracts after the irradiating is finished;

rotating the rotatable work platform: the rotatable work platform rotates to move the male mold along with the solid workpiece coated with the UV primer-coat layer from the second work are to the third work area;

performing surface coloring: perform surface coloring in the third work area of the work platform of the injection molding machine to form an other-color layer on the UV primer-coat layer or the solid workpiece;

rotating the rotatable work platform: the rotatable work platform rotates to move the male mold and the solid workpiece which has been coated with the UV primer-coat layer and the other-color layer from the third work area to the fourth work area;

injecting UV top coat: on the male mold in the fourth work area is provided a top-coat female mold to be closed up to the male mold, the top-coat mold is made of light directing material and has a die cavity, a UV paint cavity located on the UV primer-coat layer and the other-color layer of the solid workpiece, and a paint channel is located on the male mold and in communication with the UV paint cavity, after the male mold and the top-coat female mold are closed up, paint is injected through the paint channel into the UV paint cavity to form a UV top-coat layer;

irradiating the UV top coat by using UV primer-coat lamps: at least one UV primer-coat lamp is used to dry the UV top-coat layer by irradiating light through the light directing top-coat female mold, and the top-coat female mold retracts after the irradiating is finished;

demolding: demold to unload the solid workpiece which has been coated with the UV primer-coat layer, the other-color layer and the top-coat layer from the male mold, thus obtaining a finished product.

The whole processing is consecutively smooth and fast, which is of benefit to mass production and manpower saving, substantially reducing the processing cost.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
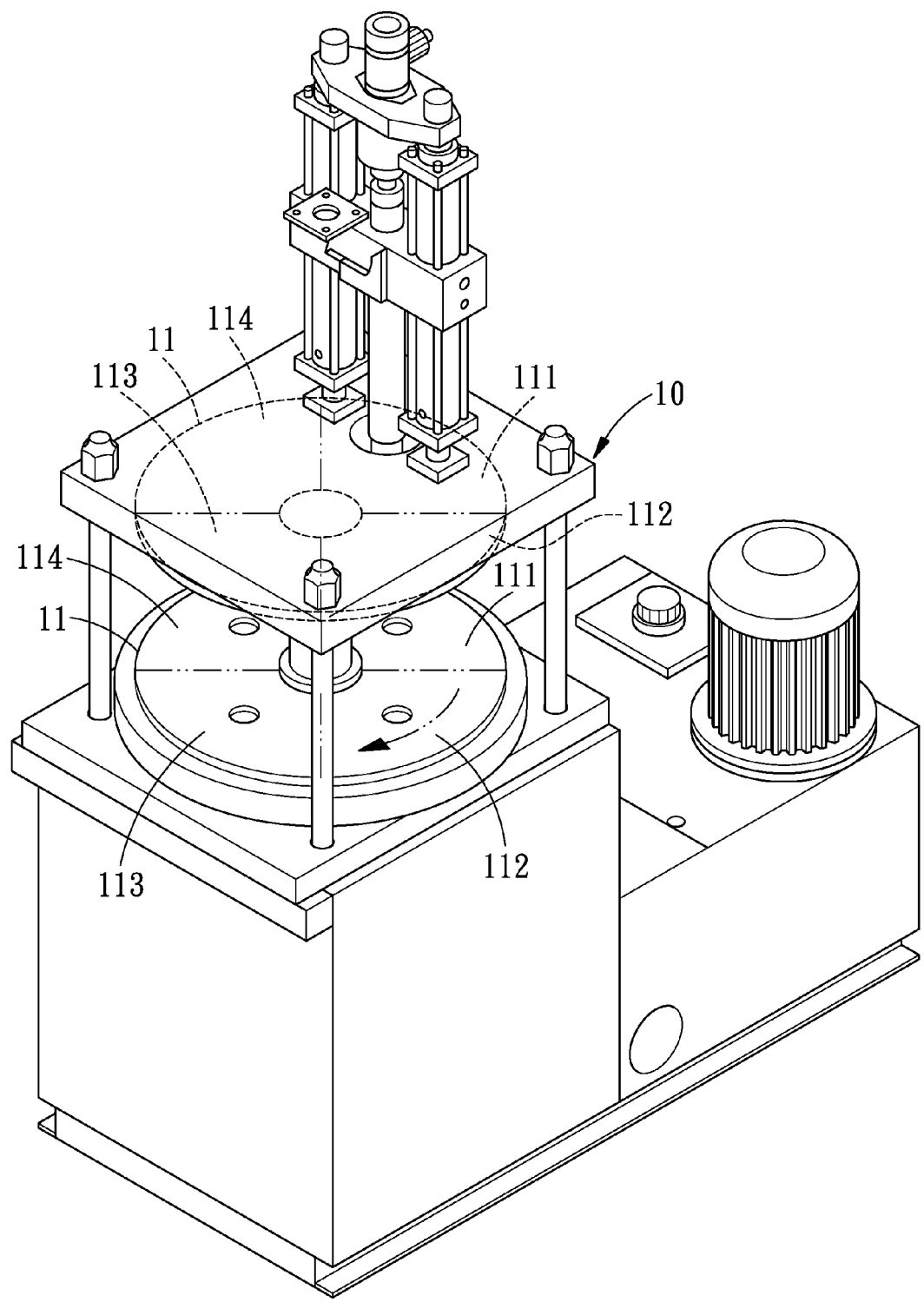
FIG. 1 is a perspective view of an injection molding machine used in cooperation with the processing method for in-mold coating integrative system in accordance with the present invention.
Figure 2:
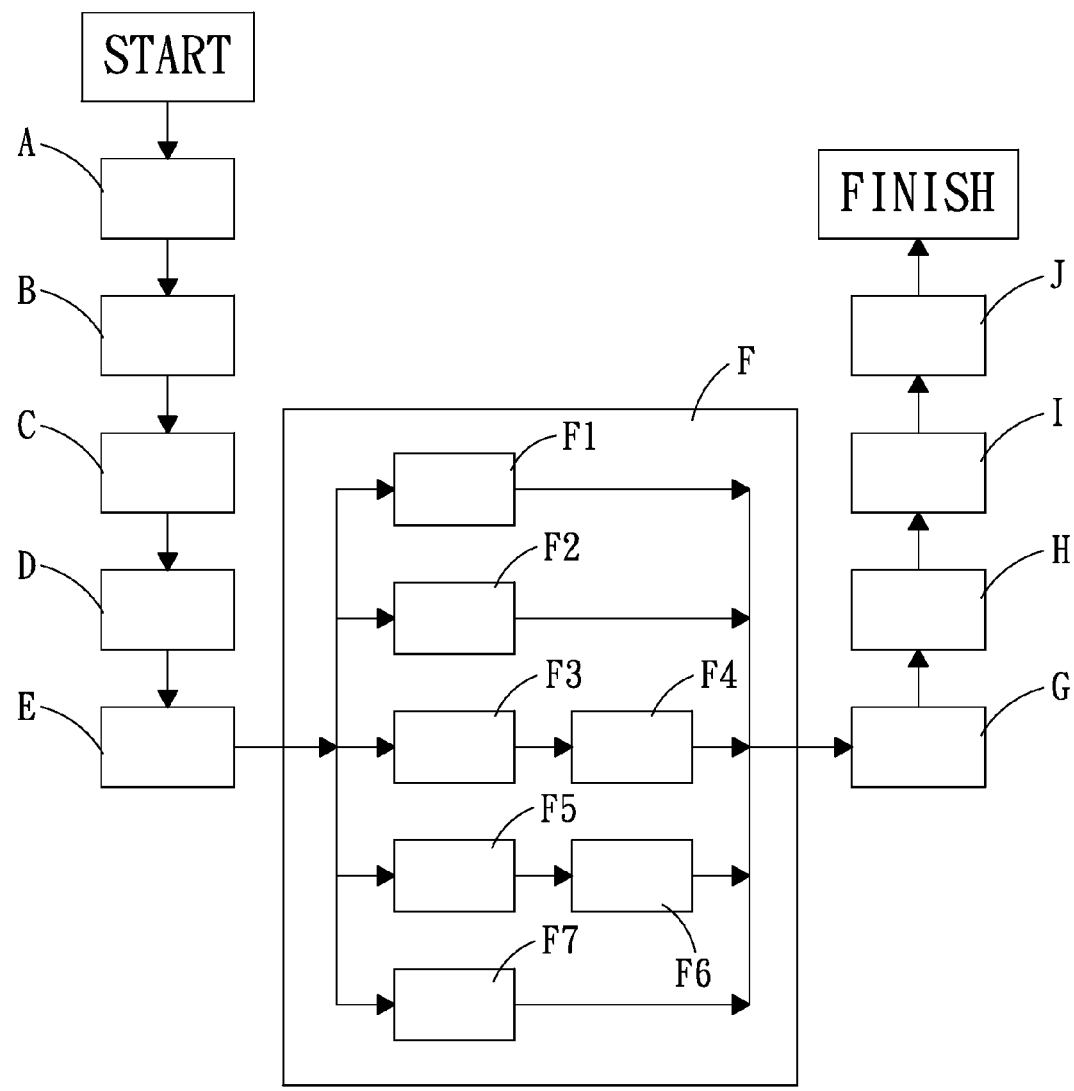
FIG. 2 is a flow chart showing the processing method for in-mold coating integrative system in accordance with the present invention.
Figure 3:
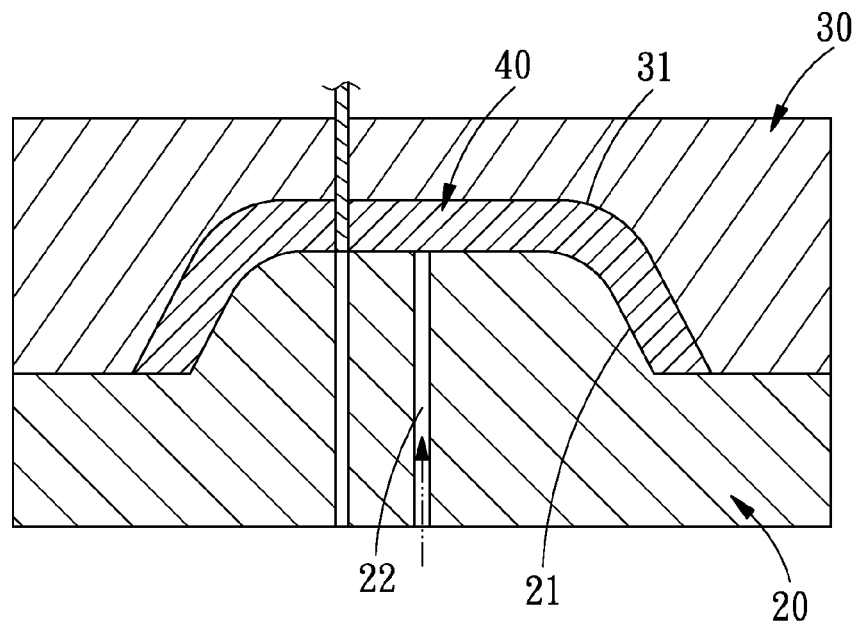
FIG. 3 is an illustrative view showing the injection molding step in accordance with the present invention.

Referring firstly to FIG. 1, a processing method for in-mold coating integrative system in accordance with the present invention is used in cooperation with an injection molding machine 10 which comprises a rotatable work platform 11 and a combination of one male mold 20 and at least two female molds 30, 50 and 80. The injection molding machine 10 can be of vertical or horizontal type. The rotatable work platform 11 is divided into several work areas 111, 112, 113 and 114, and the processing proceeds sequentially in each work area 111, 112, 113 and 114 by the rotation of the rotatable work platform 11, as shown in FIG. 2. The processing method comprises the following steps:

1. injection molding of final product (step A), in the first work area 111 are provided a male mold 20 and a molding female mold 30 which is to be closed up to the male mold 20 for injection molding, between the male and female molds 20, 30 is a cavity 21, 31 which allows for injection of colloid material (which normally is plastic, and performed by plastic injection molding machine) through a colloid channel 22 after the male and female molds 20, 30 are closed up to form a solid workpiece 40, as shown in FIG. 3, and then the molding female mold 30 retracts after injection molding.

2. rotating the rotatable work platform (step B), the rotatable work platform 11 rotates to move the male mold 20 along with the solid workpiece 40 from the first work area 111 to the second work area 112.

Figure 4:
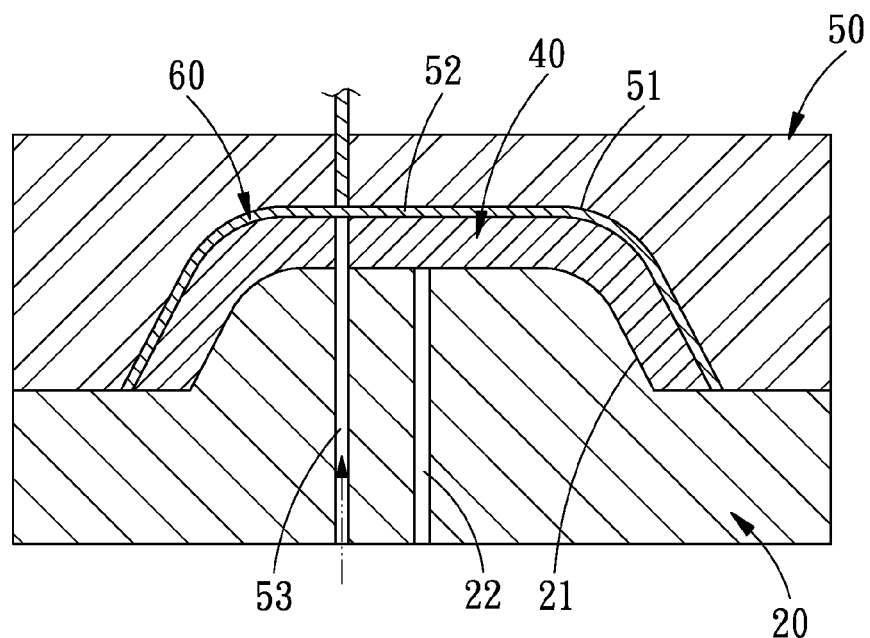
FIG. 4 is an illustrative view showing the step of injecting UV primer coat in accordance with the present invention.

3. injecting UV primer coat (step C): on the male mold 20 in the second work area 112 is provided a primer-coat female mold 50 which is closed up to the male mold 20, the primer-coat female mold 50 is made of light-directing material and has a die cavity 51, a UV paint cavity 52 in the surface of the solid workpiece 40, and a paint channel 53 in communication with the UV paint cavity 52. The paint channel 53 is located on the male mold 20 or the primer-coat female mold 50. After the male mold 20 and the primer-coat female mold 50 are closed up, paint is injected through the paint channel 53 into the UV paint cavity 52 to form a UV primer-coat layer 60, as shown in FIG. 4.

Figure 5:
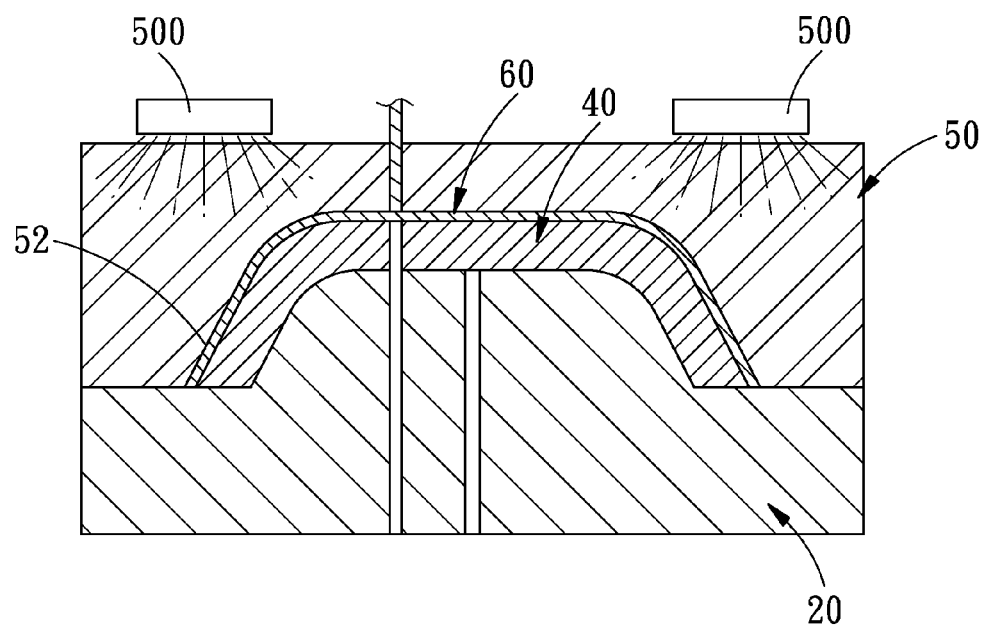
FIG. 5 is an illustrative view showing the step of irradiating the UV primer coat in accordance with the present invention.

4. irradiating the UV primer coat by using UV primer-coat lamps 500 (step D), at least one UV primer-coat lamp (ultraviolet or infrared) 500 is used to dry the UV primer-coat layer 60 by irradiating light through the light directing primer-coat female mold 50, as shown in FIG. 5, and the primer-coat female mold 50 retracts after the irradiating is finished.

5. rotating the rotatable work platform (step E), the rotatable work platform 11 goes on rotating to move the male mold 20 along with the solid workpiece 40 coated with the UV primer-coat layer 60 from the second work are 112 to the third work area 113.

Figure 6:
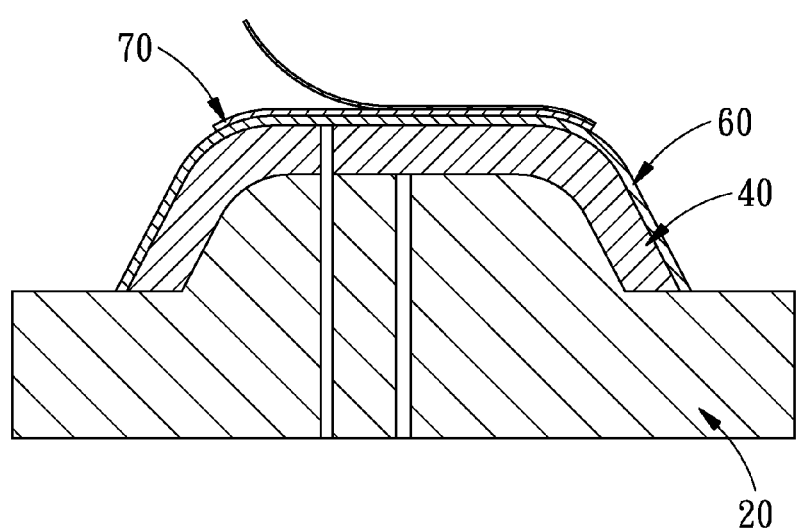
FIG. 6 is an illustrative view showing transfer printing of the surface coloring step in accordance with the present invention.
Figure 7:
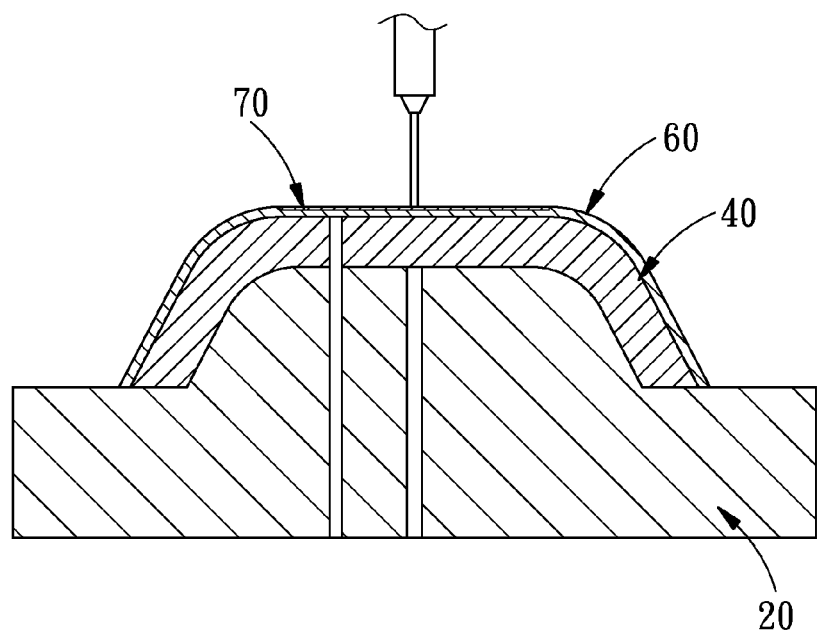
FIG. 7 is an illustrative view showing the laser engraving of the surface coloring step in accordance with the present invention.

6. performing surface coloring (step F), pad printing F1, screen printing F2 (as shown in FIG. 6), spray printing F3, drying F4, UV paint injecting F5, irradiating with UV hardening lamp F6, or laser engraving F7 (as shown in FIG. 7) is performed in the third work area 113 of the rotatable work platform 11 of the injection molding machine 10 to form an other-color layer 70 on the UV primer-coat layer 60 of the solid workpiece 40, and the color of the other-color layer 70 is different from the color of the UV primer-coat layer 60 or the solid workpiece 40.

7. rotating the rotatable work platform (step G), the rotatable work platform 11 goes on rotating to move the male mold 20 and the solid workpiece 40 which has been coated with the UV primer-coat layer 60 and the other-color layer 70 from the third work area 113 to the fourth work area 114.

Figure 8:
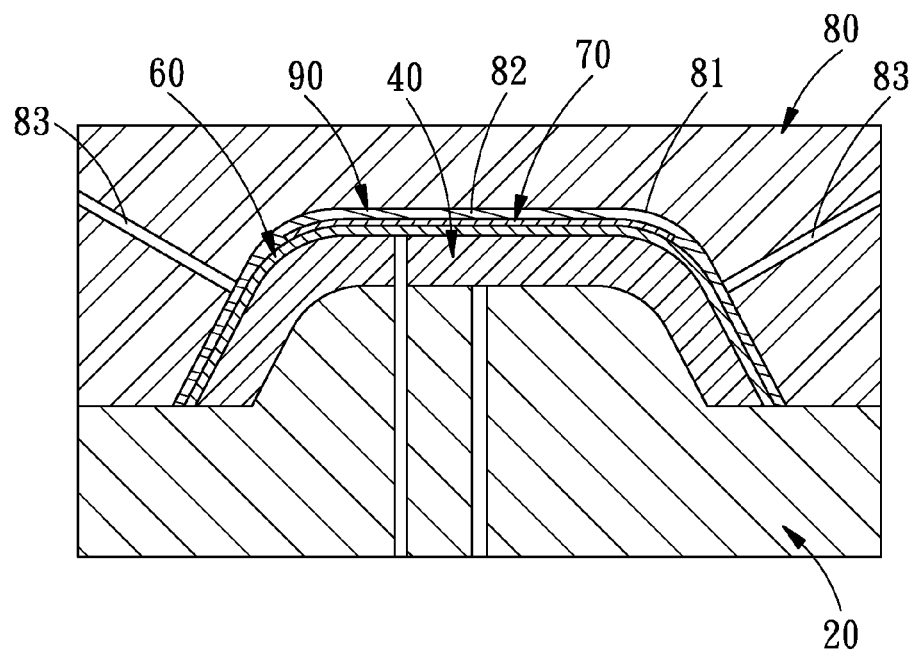
FIG. 8 is an illustrative view showing the step of injecting UV top-coat in accordance with the present invention.

8. injecting UV top coat (step H), on the male mold 20 in the fourth work area 114 is provided a top-coat female mold 80 which is to be closed up to the male mold 20, the top-coat female mold 80 is made of light directing material and has a die cavity 81, a UV paint cavity 82 located on the UV primer-coat layer 60 and the other-color layer 70 of the solid workpiece 40, and a paint channel 83 (which is located on the male mold 20 or the top-coat female mold 80) in communication with the UV paint cavity 82. After the male mold 20 and the top-coat female mold 80 are closed up, paint is injected through the paint channel 83 into the UV paint cavity 82 to form a UV top-coat layer 90 which is transparent, as shown in FIG. 8.

Figure 9:
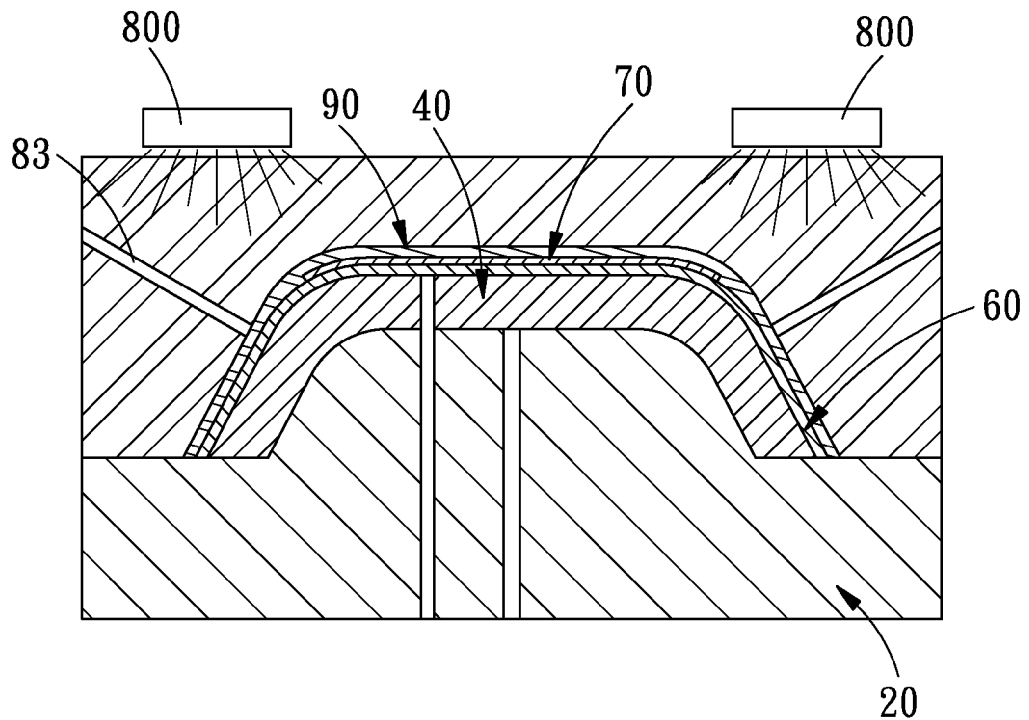
FIG. 9 is an illustrative view showing the step of irradiating the UV top-coat in accordance with the present invention.

9. irradiating the UV top coat by using UV primer-coat lamps (step I), at least one UV primer-coat lamp (ultraviolet or infrared) 800 is used to dry the UV top-coat layer 90 by irradiating light through the light directing top-coat female mold 80, as shown in FIG. 9, and the top-coat female mold 80 retracts after the irradiating is finished.

Figure 10:
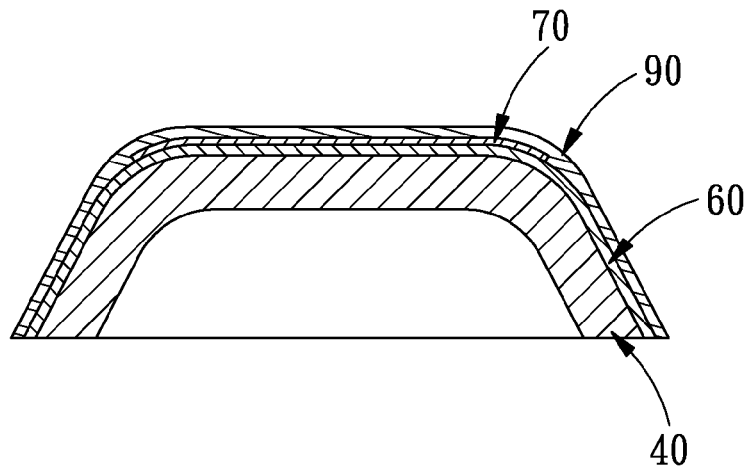
FIG. 10 is a cross sectional view of a solid workpiece made by using the processing method for in-mold coating integrative system in accordance with the present invention.

10. demolding (step J), demolding to unload the solid workpiece 40 which has been coated with the UV primer-coat layer 60, the other-color layer 70 and the UV top-coat layer 90 from the male mold 20, thus obtaining a finished product, as shown in FIG. 10.

In the step of performing surface coloring (step F), the pad printing F1, screen printing F2, spray printing F3, drying F4, UV paint injecting F5, irradiating with UV hardening lamp F6, and laser engraving F7 can be performed independently or in combination with one another. The combination of the procedures in the step F of surfacing coloring can be achieved by adding averagely divided work areas 111, 112, 113, 114 on the rotatable work platform 11. When pad printing F1 is performed, on the rotatable work platform 11 is provided hot transfer printing machine (not shown) to transfer the patter from the transfer paper to the solid workpiece 40. When screen printing F2 is used, on the rotatable work platform 11 is provided a dot printing device (not shown) to directly print patterns on the solid workpiece 40. When spray printing F3 is performed, on the rotatable work platform 11 is provided sprayer (not shown) to directly spray print patterns on the solid workpiece 40. When UV paint injecting F5 is performed, in addition to UV hardening lamps F6, it should also be provided with another female mold which is formed with a die cavity 51 and a UV paint cavity (as shown in FIGS. 8 and 9), the another female mold is light directing for permitting passage of the light of the UV hardening lamps F6. When laser engraving F7 is performed, on the rotatable work platform 11 is provided a laser head (not shown) to directly engrave burned-like and depth-controlled patterns on the solid workpiece 40.

The structures of the abovementioned embodiments have the following advantages: after it is formed on the rotatable work platform 11 by the injection molding machine 10 (step A), the formed solid workpiece 40, without having to be demolded to wait for other inconsecutive processing procedures, can be directly processed in the work areas 111, 112, 113 and 114 to sequentially form the UV primer-coat layer 60, the other-color layer 70 and the UV top-coat layer 90. The whole processing is consecutively smooth and fast, which is of benefit to mass production and manpower saving, substantially reducing the processing cost.

While we have shown and described various embodiments in accordance with the present invention, it is clear to those skilled in the art that further embodiments may be made without departing from the scope of the present invention.

What is claimed is:

1. A processing method for in-mold coating integrative system being used in cooperation with an injection molding machine which comprises a rotatable work platform and a combination of at least one male mold and at least two female molds, the rotatable work platform being divided into several work areas, and the processing proceeding sequentially in each work area by a rotation of the rotatable work platform, the processing method comprising the following steps:

injection molding of final product: in a first work area being provided a male mold and a molding female mold to be closed up to the male mold, between the male and female molds being arranged a cavity allowing for injection of colloid material through a colloid channel after the male and female molds are closed up to form a solid workpiece, and then the molding female mold retracts after injection molding;

rotating the rotatable work platform: the rotatable work platform rotating to move the male mold along with the solid workpiece from the first work area to a second work area;

injecting UV primer coat: on the male mold in the second work area being provided a primer-coat female mold to be closed up to the male mold, the primer-coat female mold being made of light-directing material and including a die cavity, a UV paint cavity in a surface of the solid workpiece, and a paint channel in communication with the UV paint cavity, after the male mold and the primer-coat female mold are closed up, paint is injected through the paint channel into the UV paint cavity to form a UV primer-coat layer;

irradiating the UV primer coat layer by using UV primer-coat lamps: at least one UV primer-coat lamp being used to dry the UV primer-coat layer by irradiating light through the light directing primer-coat female mold, and the primer-coat female mold retracts after the irradiating is finished;

rotating the rotatable work platform, the rotatable work platform rotating to move the male mold along with the solid workpiece coated with the UV primer-coat layer from the second work are to a third work area;

performing surface coloring: performing surface coloring in the third work area of the work platform of the injection molding machine to form an other-color layer on the UV primer-coat layer or the solid workpiece;

rotating the rotatable work platform: the rotatable work platform rotating to move the male mold and the solid workpiece which has been coated with the UV primer-coat layer and the other-color layer from the third work area to a fourth work area;

injecting UV top coat: on the male mold in the fourth work area being provided a top-coat female mold to be closed up to the male mold, the top-coat female mold being made of light directing material and having a die cavity, a UV paint cavity located on the UV primer-coat layer and the other-color layer of the solid workpiece, and a paint channel being located on the male mold and in communication with the UV paint cavity, after the male mold and the top-coat female mold are closed up, paint is injected through the paint channel into the UV paint cavity to form a UV top-coat layer;

irradiating the UV top coat by using UV primer-coat lamps: at least one UV primer-coat lamp being used to dry the UV top-coat layer by irradiating light through the light directing top-coat female mold, and the top-coat female mold retracts after the irradiating is finished;

demolding: demolding to unload the solid workpiece which has been coated with the UV primer-coat layer, the other-color layer and the top-coat layer from the male mold, thus obtaining a finished product.

2. The processing method for in-mold coating integrative system as claimed in claim 1, wherein the injection molding machine can be of vertical or horizontal type.

3. The processing method for in-mold coating integrative system as claimed in claim 1, wherein the UV primer-coat lamp uses ultraviolet or infrared light to harden the UV primer-coat layer or the UV top-coat layer.

4. The processing method for in-mold coating integrative system as claimed in claim 1, wherein the UV top-coat layer is transparent.

5. The processing method for in-mold coating integrative system as claimed in claim 1, wherein in the step of performing surface coloring is selected from, pad printing, screen printing, spray printing, drying, UV paint injecting, irradiating with UV hardening lamp, and laser engraving, and is performed on the work platform of the injection molding machine to form an other-color layer.

6. A processing method for in-mold coating integrative system being used in cooperation with an injection molding machine which comprises a rotatable work platform and a combination of at least one male mold and at least one female mold, the rotatable work platform being divided into several work areas, and the processing proceeding sequentially in each work area by a rotation of the rotatable work platform, the processing method comprising the following steps:

injection molding of final product: in a first work area being provided a male mold and a molding female mold to be closed up to the male mold, between the male and female molds being arranged a cavity allowing for injection of colloid material through a colloid channel after the male and female molds are closed up to form a solid workpiece, and then the molding female mold retracts after injection molding;

rotating the rotatable work platform: the rotatable work platform rotating to move the male mold along with the solid workpiece from the first work area to a second work area;

performing surface coloring: performing surface coloring in the second work area of the work platform of the injection molding machine to form an other-color layer on the solid workpiece;

rotating the rotatable work platform: the rotatable work platform rotating to move the male mold and the solid workpiece which has been coated with the other-color layer from the second work area to a third work area;

injecting UV top coat: on the male mold in the third work area being provided a top-coat female mold to be closed up to the male mold, the top-coat female mold being made of light directing material and having a die cavity, a UV paint cavity located on the other-color layer of the solid workpiece, and a paint channel being located on the male mold and in communication with the UV paint cavity, after the male mold and the top-coat female mold are closed up, paint is injected through the paint channel into the UV paint cavity to form a UV top-coat layer;

irradiating the UV top coat by using UV primer-coat lamps: at least one UV primer-coat lamp being used to dry the UV top-coat layer by irradiating light through the light directing top-coat female mold, and the top-coat female mold retracts after the irradiating is finished;

demolding: demolding to unload the solid workpiece which has been coated with the other-color layer and the top-coat layer from the male mold, thus obtaining a finished product.

7. The processing method for in-mold coating integrative system as claimed in claim 6, wherein the injection molding machine can be of vertical or horizontal type.

8. The processing method for in-mold coating integrative system as claimed in claim 6, wherein the UV primer-coat lamp uses ultraviolet or infrared light to harden the UV top-coat layer.

9. The processing method for in-mold coating integrative system as claimed in claim 6, wherein the UV top-coat layer is transparent.

10. The processing method for in-mold coating integrative system as claimed in claim 1, wherein in the step of performing surface coloring is selected from, pad printing, screen printing, spray printing, drying, UV paint injecting, irradiating with UV hardening lamp, and laser engraving, and is performed on the work platform of the injection molding machine to form an other-color layer.

* * * * *